(No Model.)  2 Sheets—Sheet 2.
C. R. OTIS.
Elevator.
No. 228,107. Patented May 25, 1880.
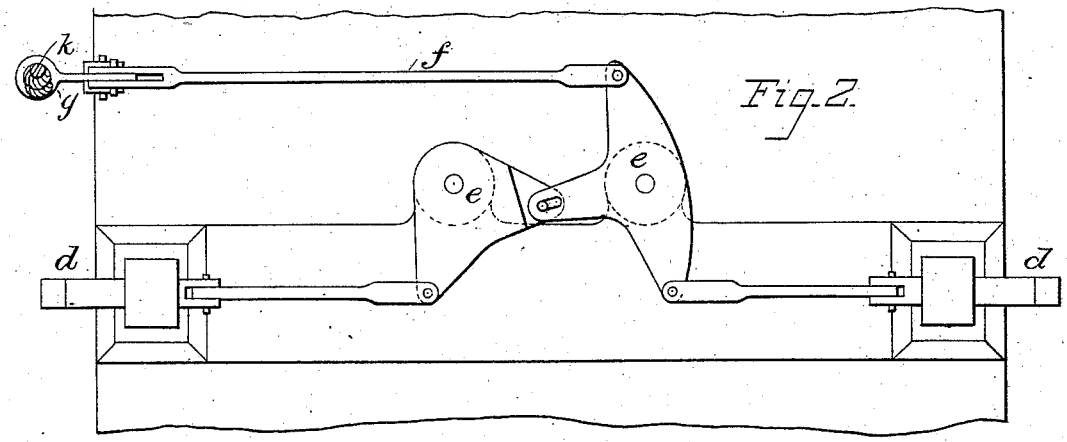
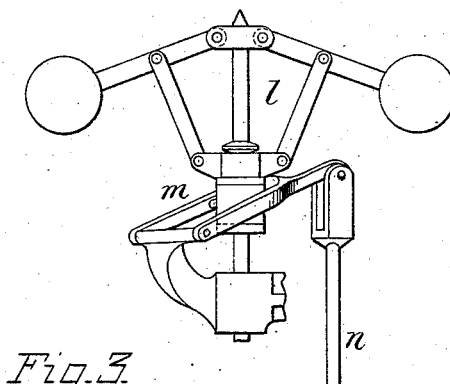
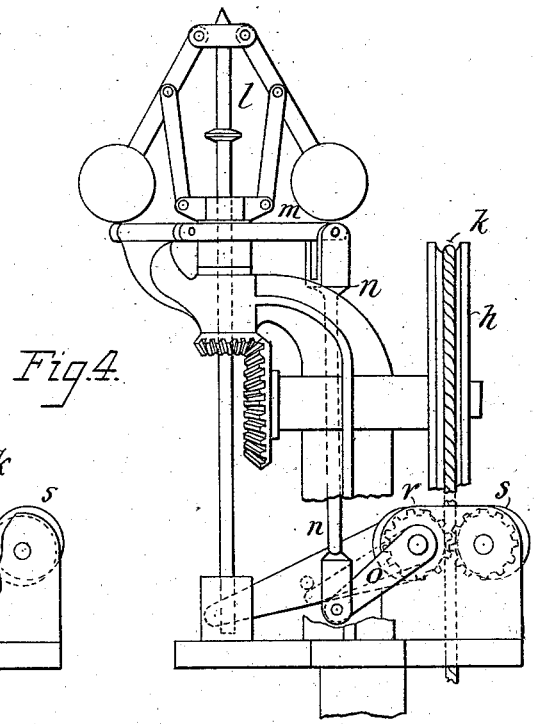
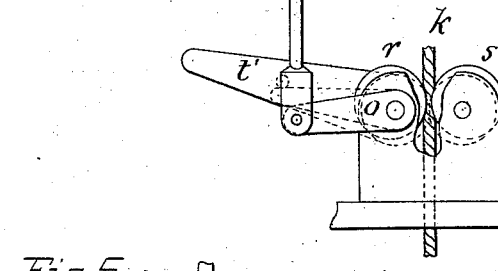
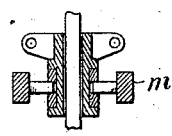
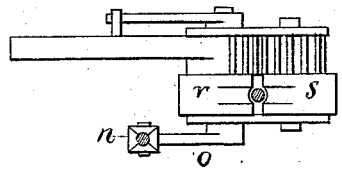
Attest:
Courtney A. Cooper
William Paxton
Charles R. Otis
By his attorney
Charles E. Foster

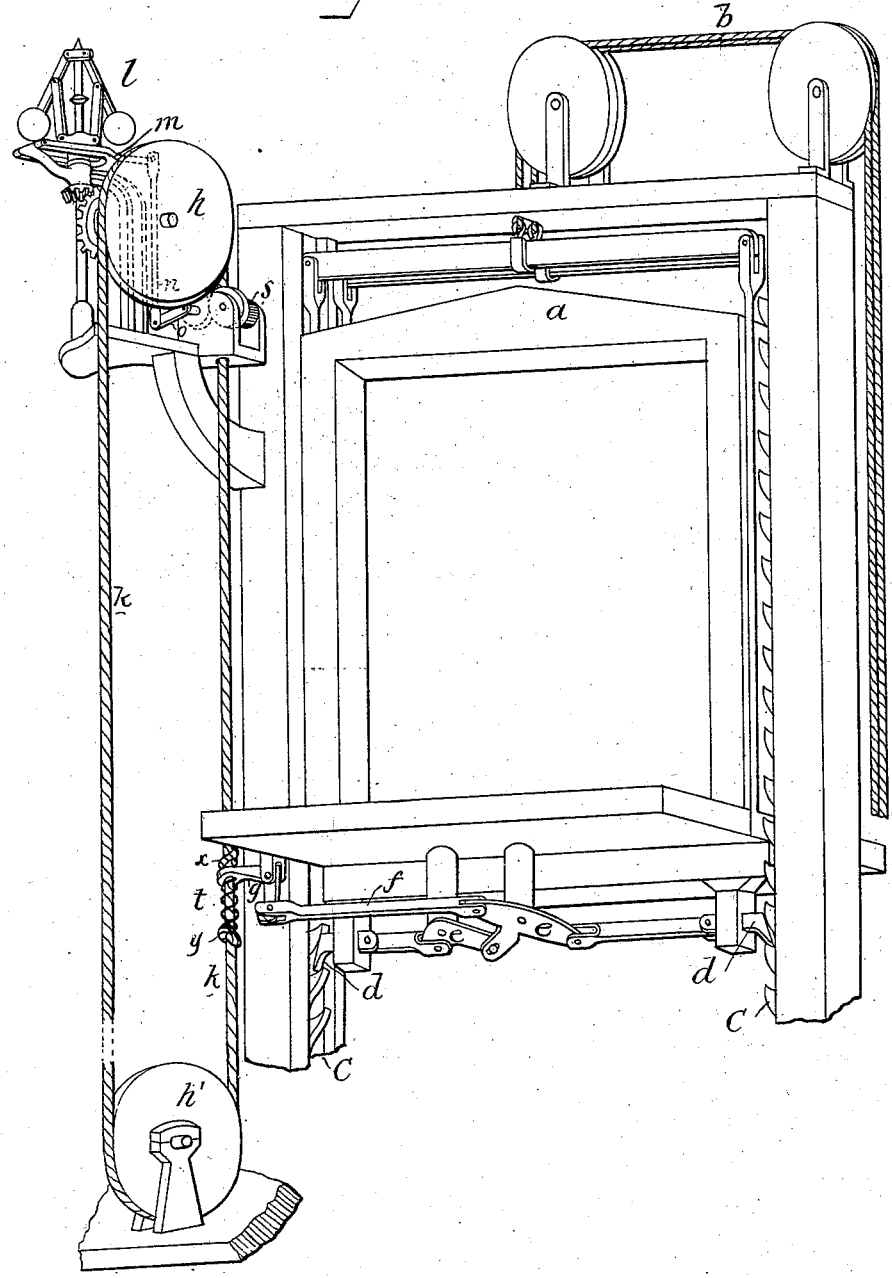

UNITED STATES PATENT OFFICE.

CHARLES R. OTIS, OF YONKERS, NEW YORK.

ELEVATOR.

SPECIFICATION forming part of Letters Patent No. 228,107, dated May 25, 1880.

Application filed March 8, 1880. (No model.)

*To all whom it may concern:*

Be it known that I, CHARLES R. OTIS, of Yonkers, Westchester county, and State of New York, have invented an Improvement in Elevators, of which the following is a specification.

My invention consists in means, fully set forth hereinafter, for preventing accidents from the breaking or slipping of the hoisting-rope of an elevating apparatus, or from the cage acquiring an undue velocity from any cause, the invention further consisting in means for automatically restoring the parts to an operative position after the movement of the cage has been arrested or reduced.

In the drawings forming part of this specification, Figure 1 is a perspective view, showing my improved apparatus applied to a goods-elevator; Fig. 2, an inverted plan of the appliance arranged beneath the cage; Figs. 3 and 4, views illustrating the governor and appliances connected therewith, showing the parts in different positions; Fig. 5, a detached section, and Fig. 6 a plan of part of Fig. 4.

My invention is shown in connection with a goods-elevator, but is equally applicable for those intended for passenger use.

The cage is of any suitable construction, slides between guides or uprights arranged as may be necessary, and is combined with one or more ropes, cables, belts, or chains, $k$.

Each cable $k$ is connected directly or indirectly to the cage, so as to travel with the latter, and for this purpose may be wound upon drums above and below, or pass over pulleys above and support counter-weights at its opposite ends, or, as I prefer, may be endless and pass completely round upper and lower pulleys, $h\ h'$, as shown in Fig. 1.

Each cable at some point of its course passes between the jaws of a griping or friction device, or under a brake, which may be constructed in any suitable manner, so as to grasp or bear frictionally upon the cable, or upon the pulley over which it passes; and in connection with the clamp or brake I use a self-acting governor of any available construction and operated in any suitable manner to apply the clamp or brake and arrest or retard the movement of the cable the instant the cage acquires from any cause an undue speed.

An apparatus for automatically clamping the cable which I have found most effective is shown in the drawings, in which the clamping-jaws are two geared eccentrics, $r\ s$, between which the cable $k$ passes, the shaft of the eccentric $r$ having a crank, $o$, connected by a rod, $n$, to the operating-lever $m$ of an ordinary ball-governor, $l$. This governor is driven by gears from the shaft of the upper cable-pulley, $h$, and when the cage acquires any unusual speed will raise the lever $m$, bring the eccentrics upon the cable, and arrest or retard its movement and that of the cage.

I do not limit myself to any special construction of locking mechanism, but have shown the contrivance illustrated in the patent granted to Elisha G. Otis, January 15, 1861, and in which vertical racks $c\ c$ on the guides operate in connection with pawls $d\ d$ carried by the cage. These pawls and ratchet-teeth I make hook-shaped at the ends, as shown, for a purpose described hereinafter.

The pawls or detents may be combined with various appliances whereby they may be thrown out when the cage exceeds its normal speed. For instance, the pawls are connected each to a horizontal bell-crank, $e$, the cranks being connected to operate in unison, and one of said cranks is connected by a rod, $f$, to a third crank, $g$, which is vertical, and which has an extended arm perforated at the outer end for the attachment or passage of the cable $k$.

Knots or stops $x$ and $y$ on the cable, above and below the arm of the crank, serve as bearings for the latter should the motion of the cable be arrested, thereby turning the crank and operating the pawls, the hooked form of which will insure their further outward movement and the sure locking of the cage whenever they are thrown outward sufficiently for the points to pass those of the hook-shaped ratchet-teeth, this outward movement resulting when the lever $g$ is brought against the stop $x$, after the movement of the cable ceases or is retarded.

A spring, $t$, is interposed between the knot or bearing $x$ and the arm of the lever $g$, which will have the effect of preventing the straining of the cable or its attachments by the descent of the cage after the cable is griped, but before the pawls find a bearing upon the ratchet-teeth.

Other modes of forming a slightly yielding connection between the cable and detent operating devices will be obvious—as, for instance, providing the lever $g$ with an elastic arm.

In the various safety apparatus heretofore used for arresting the movements of the cage when the latter is no longer properly controlled by the hoisting machinery, the safety devices, after being thrown into action, must be reset by hand before operations can be resumed.

The above-described apparatus automatically retracts and resets the safety appliances, so that the latter act as brakes or stops to arrest the cage when it attains too great a speed, but resume their position when speed is reduced, or when the cage is elevated after the motion has been arrested.

In the construction shown and described the pawls will be retracted by the bearing of the arm of the crank $g$ upon the stop $y$ when the cage ascends; but it will be apparent that a spring or weight may be used to throw them back when pressure is removed, and that various other appliances may be employed with like effect. Thus the cage will be arrested or (in case retarding instead of arresting devices are used) retarded on the slightest increase of speed above a determined rate (and this may be whether in ascending or descending, the arresting devices being constructed accordingly) without necessarily throwing the machine out of operation, the action being automatic, and only for such a length of time as may be necessary to arrest the cage or reduce the excess of speed, the ordinary operations being at once resumed after the speed is reduced, unless the elevating machinery has become inoperative.

Heretofore springs or weights have been depended upon as a means for throwing out the safety detents, pawls, or catches, so that any obstruction to the movement equaling the force of the spring or weight would neutralize the latter and render the device inoperative.

In my above-described invention the whole weight and momentum of the cage and its load at the moment the cable $k$ is arrested are thrown upon the detent-operating devices, and become available for forcing the latter by a positive movement into a position to arrest the motion of the cage, and this force will invariably act, for, even should the cable $k$ break, the strain prior to rupture would be greatly in excess of any power requisite to throw the pawls. By using a cable connected to the cage to travel therewith, and the governor and brakes, but without any retarding devices or detents, the griping of the cable will afford a substantial support for the car through the instrumentality of said cables alone should the hoisting-rope break; or two cables may be so used, and may be combined with appliances whereby both will be simultaneously griped by the action of one governor.

I claim—

1. The combination, in an elevator, of a cage-elevating mechanism, one or more cables connected to the cage, to travel therewith, and appliances, constructed substantially as set forth, to automatically retard or arrest the movement of the cable when the speed of the cage becomes excessive, but release the same as the motion is reversed or reduced, substantially as specified.

2. The combination of the cage, cable $k$, connected to and moving therewith, governor and clamp or brake arranged to bear upon the cable or its pulley, and appliances whereby the brake is applied and removed by the action of the governor, substantially as set forth.

3. The combination, with an elevator-cage having appliances for arresting or retarding the movement thereof, of mechanism for throwing said appliances into operation on an undue increase of speed, and devices for automatically restoring the said appliances to their first position as the speed is reduced or motion arrested or reversed, substantially as set forth.

4. The combination, with a cage and its arresting appliances, of the cable $k$, connected thereto and traveling therewith, governor operated by said cable, and clamp operated by the governor to automatically gripe and release the cable, substantially as set forth.

5. The combination, with the cage of an elevator, of detents and appliances provided with an operating-arm, and constructed and arranged to force out said detents under the weight of the cage when the said arm is brought against a stationary bearing, substantially as set forth.

6. The combination of the cage, its detents, the cable $k$ and its retarding appliances, and spring interposed between the operating-arm of the stopping or retarding devices and a bearing on the cable, substantially as set forth.

7. The combination of the cage, its arresting devices, operated from a crank or arm, a cable traveling with the cage and connected to said arm, governor operated by the movement of the cable, and jaws arranged adjacent to the cable, to act directly thereon, and connected to the governor, to be opened and closed thereby, substantially as set forth.

In testimony whereof I have signed my name to this specification in the presence of two subscribing witnesses.

CHAS. R. OTIS.

Witnesses:
CHARLES E. FOSTER,
JOHN McMAHON.